US008232997B2

(12) United States Patent
Schorr et al.

(10) Patent No.: US 8,232,997 B2
(45) Date of Patent: Jul. 31, 2012

(54) SYSTEM AND METHOD FOR PROVIDING A DYNAMIC EXPANDED TIMELINE

(75) Inventors: Janet L. Schorr, Seattle, WA (US); Brent Gilbert, Mukilteo, WA (US); Mark Fredrick Iverson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/312,805

(22) Filed: Dec. 6, 2011

(65) Prior Publication Data

US 2012/0079403 A1 Mar. 29, 2012

Related U.S. Application Data

(63) Continuation of application No. 13/050,850, filed on Mar. 17, 2011, now Pat. No. 8,072,457, which is a continuation of application No. 10/736,435, filed on Dec. 15, 2003, now Pat. No. 7,944,445.

(51) Int. Cl.
*G06T 11/20* (2006.01)
(52) U.S. Cl. ...................................................... 345/440
(58) Field of Classification Search ................... 345/440
See application file for complete search history.

(56) References Cited

U.S. PATENT DOCUMENTS

| | | | |
|---|---|---|---|
| 5,406,476 A | 4/1995 | Deziel, Jr. et al. | |
| 5,500,938 A * | 3/1996 | Cahill et al. | 715/856 |
| 5,528,745 A | 6/1996 | King et al. | |
| 5,805,444 A * | 9/1998 | Seymour | 700/16 |
| 5,874,965 A * | 2/1999 | Takai et al. | 345/667 |
| 5,936,625 A | 8/1999 | Kahl et al. | |
| 6,047,260 A * | 4/2000 | Levinson | 705/7.15 |
| 6,369,840 B1 | 4/2002 | Barnett et al. | |
| 6,392,651 B1 | 5/2002 | Stradley | |
| 6,600,501 B1 * | 7/2003 | Israel et al. | 715/810 |
| 7,051,036 B2 | 5/2006 | Rosnow et al. | |
| 7,082,380 B2 * | 7/2006 | Wiebe et al. | 702/182 |
| 7,944,445 B1 * | 5/2011 | Schorr et al. | 345/440 |
| 8,072,457 B2 * | 12/2011 | Schorr et al. | 345/440 |
| 2003/0106039 A1 | 6/2003 | Rosnow et al. | |
| 2004/0002888 A1 | 1/2004 | Draper et al. | |
| 2004/0098290 A1 * | 5/2004 | Hirschenberger et al. | 705/8 |
| 2004/0100468 A1 * | 5/2004 | Tenten et al. | 345/440 |
| 2004/0189647 A1 * | 9/2004 | Sheasby et al. | 345/473 |
| 2005/0096950 A1 * | 5/2005 | Caplan et al. | 705/7 |
| 2006/0174211 A1 | 8/2006 | Hoellerer et al. | |

OTHER PUBLICATIONS

Mackinlay, John D. et al., "Developing Calendar Visualizers for the Information Visualizer," Nov. 2-4, 1994, Xerox Palo Alto Research Center.
Merrian-Websters's Collegiate Dictionary, Eleventh Edition, Merriam-Webster, p. 1309.
Visio 2000 Standard Edition User Guide, 1999, Visio Corporation.
Gini Courter and Annette Marquis, Microsoft Office 2000 Professional Edition, Sybex, Inc., Part IV, pp. 377-537. Kullberg, Robin L., "Dynamic Timelines: Visualizing the History of Photography," Conference on Human Factors in Computing Systems archive Conference Companion on Human Factors in Computing Systems: Common Ground Table of Contents, Vancouver, British Columbia, Canada, pp. 386-387, 1996, ISBN:0-89791-832-0.

* cited by examiner

*Primary Examiner* — Javid A Amini
(74) *Attorney, Agent, or Firm* — Perkins Coie LLP

(57) ABSTRACT

Generating a child timeline on a drawing sheet of a diagramming program such that the child timeline is dynamically linked to a parent timeline. An automated method allows for the automatic placing of information on the child timeline that was on the parent timeline when the child timeline is created. Parent and child timelines can be modified and a child timeline can be automatically updated when changes are made to the parent timeline and these changes affect the time interval corresponding to the child timeline.

17 Claims, 10 Drawing Sheets

US 8,232,997 B2

SYSTEM AND METHOD FOR PROVIDING A DYNAMIC EXPANDED TIMELINE

CROSS-REFERENCE TO RELATED APPLICATIONS

This application is a continuation application of U.S. patent application Ser. No. 13/050,820, now U.S. Pat. No. 8,072,457, filed Mar. 17, 2011, entitled "SYSTEM AND METHOD FOR PROVIDING A DYNAMIC EXPANDED TIMELINE," which is a continuation of U.S. patent application Ser. No. 10/736,435, now U.S. Pat. No. 7,944,445, filed on Dec. 15, 2003, and entitled "SYSTEM AND METHOD FOR PROVIDING A DYNAMIC EXPANDED TIMELINE," which are incorporated herein in their entirety by reference.

FIELD OF THE INVENTION

The present invention relates to a dynamic expanded timeline for use in an electronic document and specifically to generating and modifying a timeline in a diagramming or similar software program that is dynamically-linked to an existing timeline.

BACKGROUND OF THE INVENTION

Computer-generated electronic documents have become an integral part of day-to-day life for many people. The business world has grown increasingly dependent on these documents for exchanging information. One specific type of electronic document is generated by a diagramming computer software application. Diagramming applications, such as VISIO®, by the Microsoft Corporation of Redmond, Wash., can be used to generate graphical images for block diagrams, brainstorming, business processes, charts and graphs, marketing diagrams, flowcharts, maps, organizational charts, project schedules, timelines, engineering, networking, and software and web design.

Timelines can be used to illustrate the temporal relationship between events. Timelines can be used to present this relationship for a variety of applications, such as presenting the relationship between historical events or presenting the relationship between activities associated with a business project. Timelines may be configured to illustrate different relationships using unique shapes to indicate milestones, start and end dates, and intervals of time that are a subset of the overall timeline interval. Often, a desired feature for a timeline is to have the timeline be proportional. That is, a unit of length of the timeline corresponds to a specific length of time. For example, with a time line that is nine inches in length and covering eighteen months, one inch of length of the timeline would correspond to two months of time. These timelines may be static or dynamic. In a dynamic timeline, shapes located at one point on a timeline may be moved to a different location on the timeline and the properties associated with that shape, such as its date, are automatically updated. For example, a milestone with an associated date of Aug. 22, 2003 could be dragged, using a pointing device and a Graphical User Interface (GUI), from one position on a timeline to a new position on the timeline representing the date Sep. 11, 2003. The display and configuration of the timeline may then be updated to indicate that the moved milestone is now associated with the date of Sep. 11, 2003.

One limitation in the current state of the art in presenting proportional, computer generated timelines is that the timeline can typically hold only a limited amount of information before the image is cluttered to the point that it no longer effectively communicates the desired information. For example, a timeline may illustrate a six-month long project along a six inch length. In this example, for a proportional timeline, one inch of length corresponds to one month of the project. However, a one-month time period may include a large number of milestones that a user may want to illustrate. A one-inch segment would not effectively present this large amount of information. To overcome this limitation, a user may generate a new, expanded timeline, on the same presentation page or a different page, that covers the one-month period. In this case, with a six-inch timeline, each inch may correspond to five days. The user can add the upper-level milestones that are presented on the main timeline to the expanded timeline and then add additional milestones to the expanded timeline.

Although this additional timeline can now be used to effectively present a large number of milestones, this approach has limitations. To make this expanded timeline, the user must duplicate the effort used to make the main timeline and ensure that the upper-level milestones presented on the main timeline for the expanded time period are accurately captured on the expanded timeline.

Also, changes made to the main timeline, also referred to herein as the parent timeline, are not automatically reflected on the expanded timeline, also referred to herein as the child timeline. As such, when a user changes a milestone on the parent timeline that falls within the time period of the child timeline, the user must then make the same change to that milestone on the child timeline, doubling the work required to make the change and increasing the chance for error.

What is needed is a computer-implemented method and system for automatically generating a child timeline from a selected portion of a parent timeline, where that child timeline will be dynamically-link to the parent timeline such that when the parent timeline is updated, the child timeline is automatically updated.

SUMMARY OF THE INVENTION

The present invention provides a computer implemented method for automatically generating a child timeline from a selected portion of an existing parent timeline. In accordance with this method, the child timeline may be dynamically-link to the parent timeline such that when the parent timeline is updated, the child timeline is automatically updated.

In one aspect of the present invention, a method is provided for generating a child timeline. The method includes selecting a portion of the existing timeline, generating the child timeline based on the portion of the existing timeline, and dynamically-linking the child timeline to the existing timeline.

In another aspect, a computer-implemented method for modifying a timeline is provided. This timeline is dynamically-linked to a second timeline such that the second timeline is associated with a portion of the first timeline. Steps include modifying the first timeline, determining if the modification affects the first timeline at the portion of the first timeline associated with second timeline and if so, then modifying the second timeline in the same way as the first timeline was modified.

In yet another aspect, a system for dynamically-linking a child timeline to an existing timeline is provided. The system includes a drawing sheet module and a timeline module. The timeline module is logically coupled to the drawing sheet module and is operable to select a portion of the existing timeline in response to an action by a user, generate the child timeline based on the portion of the existing timeline, and dynamically-link the child timeline to the existing timeline.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support a system and method for automatically generating a child timeline on a drawing sheet of a diagramming program such that the child timeline is dynamically linked to a parent timeline. The method allows for the automatic placing of information on the child timeline that was on the parent timeline when the child timeline is created. The method also supports modifying parent and child timelines and automatically updating a child timeline when changes are made to the parent timeline and these changes affect the time interval corresponding to the child timeline.

Figure 1:
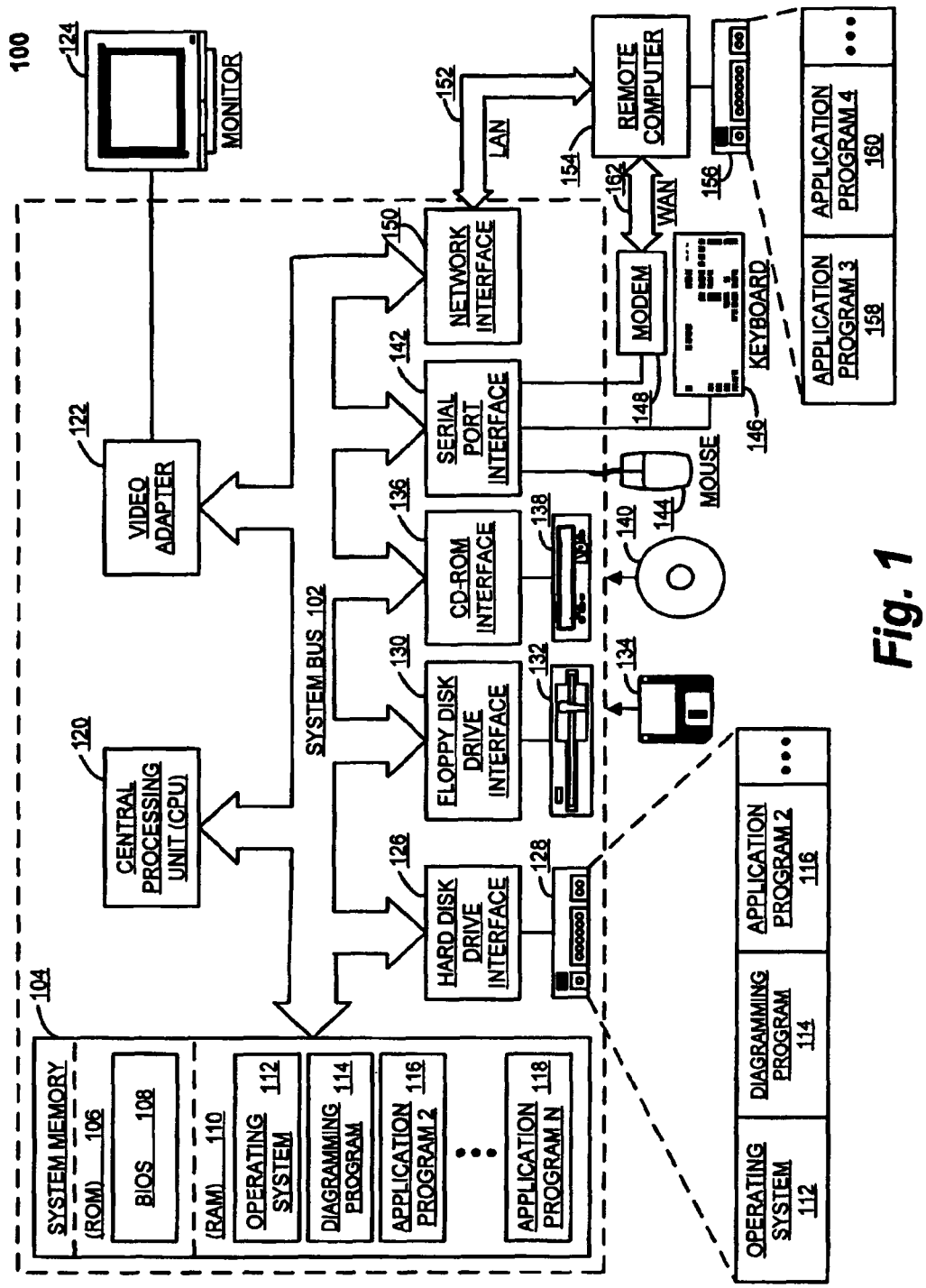
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, a diagramming program 114, and multiple application programs 116-118. A representative embodiment of a document editor is disclosed in more detail below in connection with FIG. 2. Program modules typically include routines, sub-routines, programs, objects, components, data structures, etc., that perform particular tasks or implement particular abstract data types. A diagramming program 114 may allow a user to generate diagrams used to communicate information. These diagrams may include process flow charts, maps, project schedules, floor plans, organization charts, or networks. One specific diagram that may be generated using a diagramming program 114 in context of the present invention is a timeline, which may communicate the relative position in time of specific events or milestones.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. The monitor 124 may display images generated by an application program, such as a diagramming program 114, and comprise a GUI by which a user can input information to the application program and the application program can communicate information to a user. In addition to the monitor 124, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor-based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
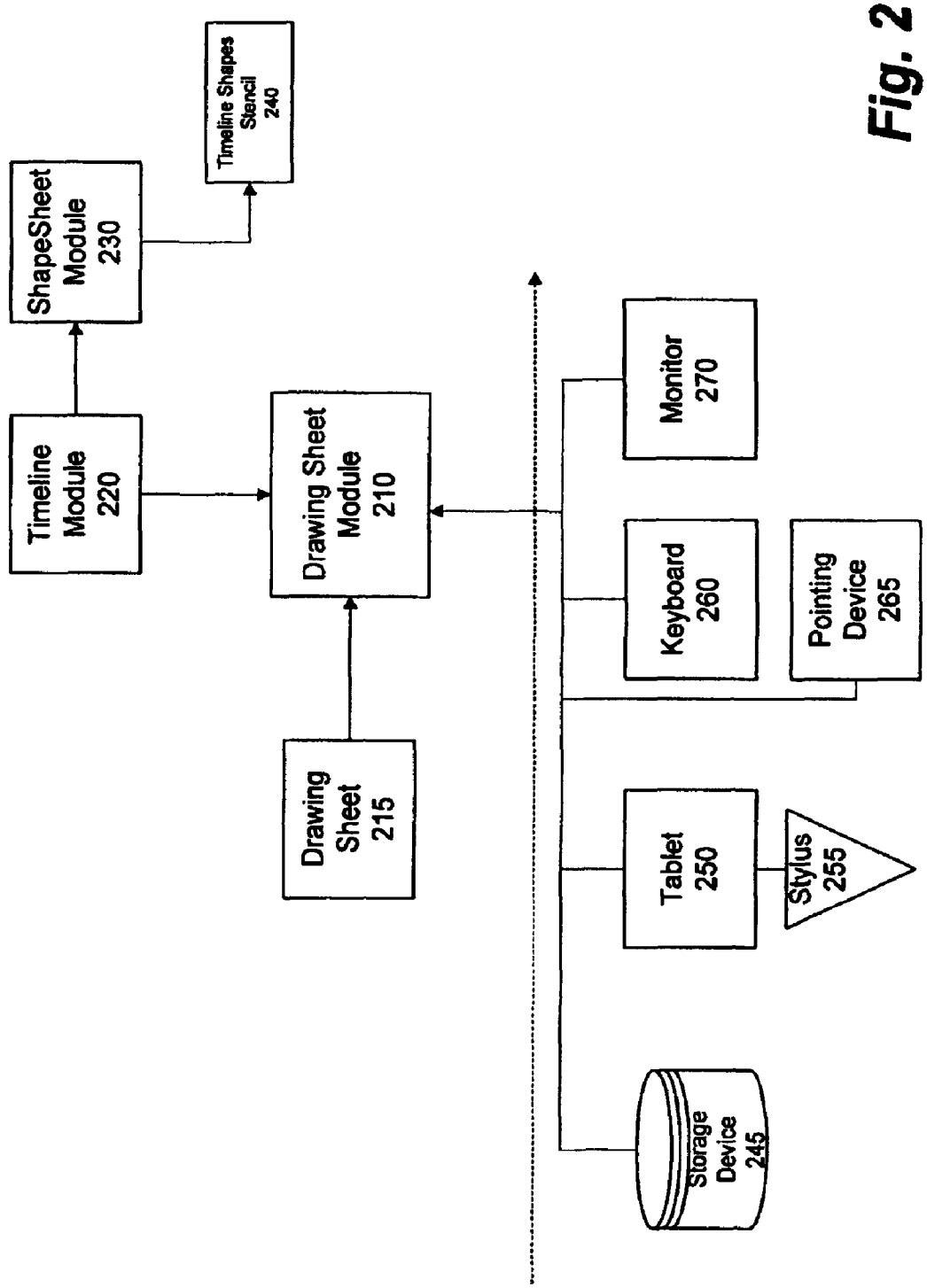
FIG. 2 is a block diagram depicting functional components of an exemplary diagramming program and related input devices.

FIG. 2 is a block diagram 200 depicting functional components of an exemplary diagramming program and related input devices. Referring to FIGS. 1 and 2, a drawing sheet module 210 is a component of a diagramming application 114. The drawing sheet module 210 interacts with a timeline module 220 to form a timeline on an electronic drawing sheet 215. This interaction allows a user, through input devices such as a keyboard 260, a stylus 255, or a pointing device 265 and output devices such as a monitor 270 or tablet 250, to generate a diagram, such as a timeline, on the drawing sheet 215. An electronic file representing the drawing sheet 215 may be stored in a storage device 245.

The timeline module 220 may rely on a shapesheet module 230, which may have access to a variety of specific shape files, or stencils, including a timeline shapes stencil 240. The timeline module 220 may present a window containing the timeline shapes stencil 240 to a user, where icons or other representations of specific shapes can be moved from the timeline shape stencil 240 to a drawing sheet 215. This movement may be accomplished by dragging and dropping the representation of a shape from the timeline shape stencil 240 to the drawing sheet 215 using a pointing device 265, such as mouse, or by using one or more keystrokes from a keyboard 260.

One skilled in the art will appreciate that FIG. 2 presents a limited representation of one exemplary diagramming program and that other configurations may be used. Also, one skilled in the art will appreciate that the exemplary diagramming program 114 may have additional modules to allow for other types of diagramming presentations. FIGS. 6 through 10 present display images associated with a drawing sheets 215 containing timelines. These figures are discussed in detail below.

Figure 3:
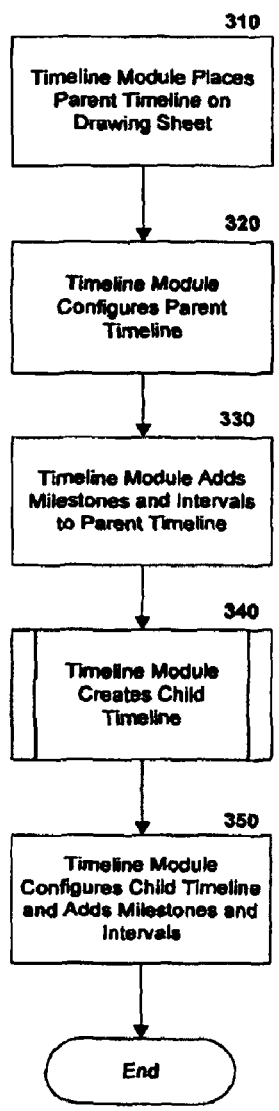
FIG. 3 is a flow diagram presenting a process for creating dynamically-linked timelines in accordance with an exemplary embodiment of the present invention.

FIG. 3 is a flow diagram presenting a process 300 for creating dynamically-linked timelines in accordance with an exemplary embodiment of the present invention. Referring to FIGS. 2 and 3, at step 310, the timeline module 220 places a parent timeline on a drawing sheet 215. This step may be accomplished by dragging and dropping a representation of a timeline from a window containing the timeline shape stencil 240, such as with a pointing device 265. Alternatively, a drawing sheet 215 with one or more existing timelines could be opened by the drawing sheet module 210 such that one or more of these timelines will be used as a parent timeline to generate a child timeline. Also, the timeline module 220 may automatically generate a timeline from information contained in another software program, such as a project management software program.

At step 320, the timeline module 220 configures the parent timeline. In this step, a user sets parameters associated with the timeline. These parameters may include the start and end date for the timeline, the format for presenting dates on the timeline, and any secondary demarcation of time intervals on the timeline, such as weeks or months. This configuration step may be accomplished by a user selecting items in and adding information to a window formatted by the timeline module 220. Alternatively, an existing timeline could have been selected at step 310 and this selected timeline could already be configured.

At step 330, the timeline module 220 adds milestones, time intervals, and other information to the parent timeline. In this step, the timeline module 220, in response to a user placing icons or other representations on a timeline as appropriate for the information being presented, displays through a GUI the timeline containing the icons or other representations. A user may configure the milestones and time intervals. This configuration step may be accomplished by a user selecting items for and adding information to a window formatted by the timeline module 220. Alternatively, an existing timeline could have been selected at step 310 and this selected timeline could already contain milestones or other information.

At step 340, the timeline module 220 creates a child timeline based on the parent timeline created or selected at step 310. This step is discussed in greater detail below, in connection with FIG. 4. At step 350, the timeline module configures the child timeline and adds milestones, time intervals, and other information as appropriate for the information being presented, similar to the steps 320 and 330, discussed above. One skilled in the art would appreciate that a parent timeline could support multiple child timelines. Similarly, a child timeline may serve as a parent timeline of a further child timeline.

Figure 4:
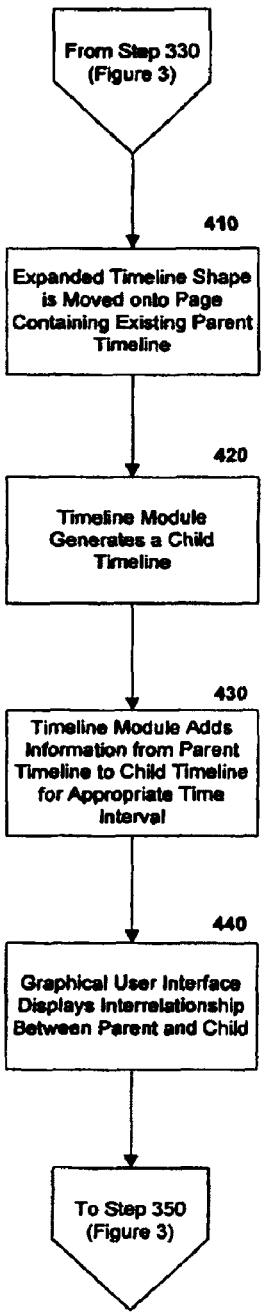
FIG. 4 is a flow diagram presenting a process for creating a child timeline that is dynamically-linked to a parent timeline in accordance with an exemplary embodiment of the present invention.

FIG. 4 is a flow diagram presenting a process 340 for creating a child timeline that is dynamically-linked to a parent timeline in accordance with an exemplary embodiment of the present invention. Referring to FIGS. 2, 3, and 4, at step 410, an expanded timeline shape is moved onto a page containing an existing timeline, this timeline to become a "parent timeline." This step may be accomplished by a user dragging an icon representing an expanded timeline from a timeline shape stencil 240 being displayed to the user in a window by a GUI and dropping the icon onto the representation of the parent timeline on the GUI or onto another position on the page. The expanded timeline icon may include handles that allow the user to adjust the length of the icon to cover the appropriate length of the parent timeline, that is the length corresponding to the time interval for the child timeline. One skilled in the art will appreciate that other techniques may be used to indicate that a child timeline should be generated from a parent timeline. For example, one or more keystrokes from a keyboard 260 or a user selecting an item from a menu, perhaps using a pointing device 265 and clicking on the parent timeline with one mouse button to generate the menu, may cause the timeline module 220 to associate an child timeline with a parent timeline.

At step 420, in response to step 410, the timeline module 220 generates a child timeline on the same drawing sheet 215 as the parent timeline. Alternatively, a child timeline may be placed on a new sheet. A user may move the generated timeline to a new position on the page if desired.

At step 430, the timeline module 220 adds milestones, intervals, and other information from the parent timeline to the child timeline for the time interval covered by the child timeline. For example, if the parent timeline has a milestone for Aug. 22, 2003 and that date is within the time period covered by the child timeline, then that milestone is place onto the child timeline at step 430.

At step 440, the GUI or other display on a monitor 270 or tablet 250, displays the parent timeline with an indication that a child timeline exists. This indication may include an icon on the parent timeline showing the time interval covered by the child timeline. This icon may contain handles that allow the time interval of the child to be modified. Modifications to the timeline are discussed in greater detail below, in connection with FIG. 5. Additionally, dotted lines may extend from a parent timeline to a child timeline shown an the same drawing sheet 215. These dotted lines may extend from one end of the child timeline to a position on the parent timeline representing that same time. After step 440, the process returns to step 350 of process 300.

Figure 5:
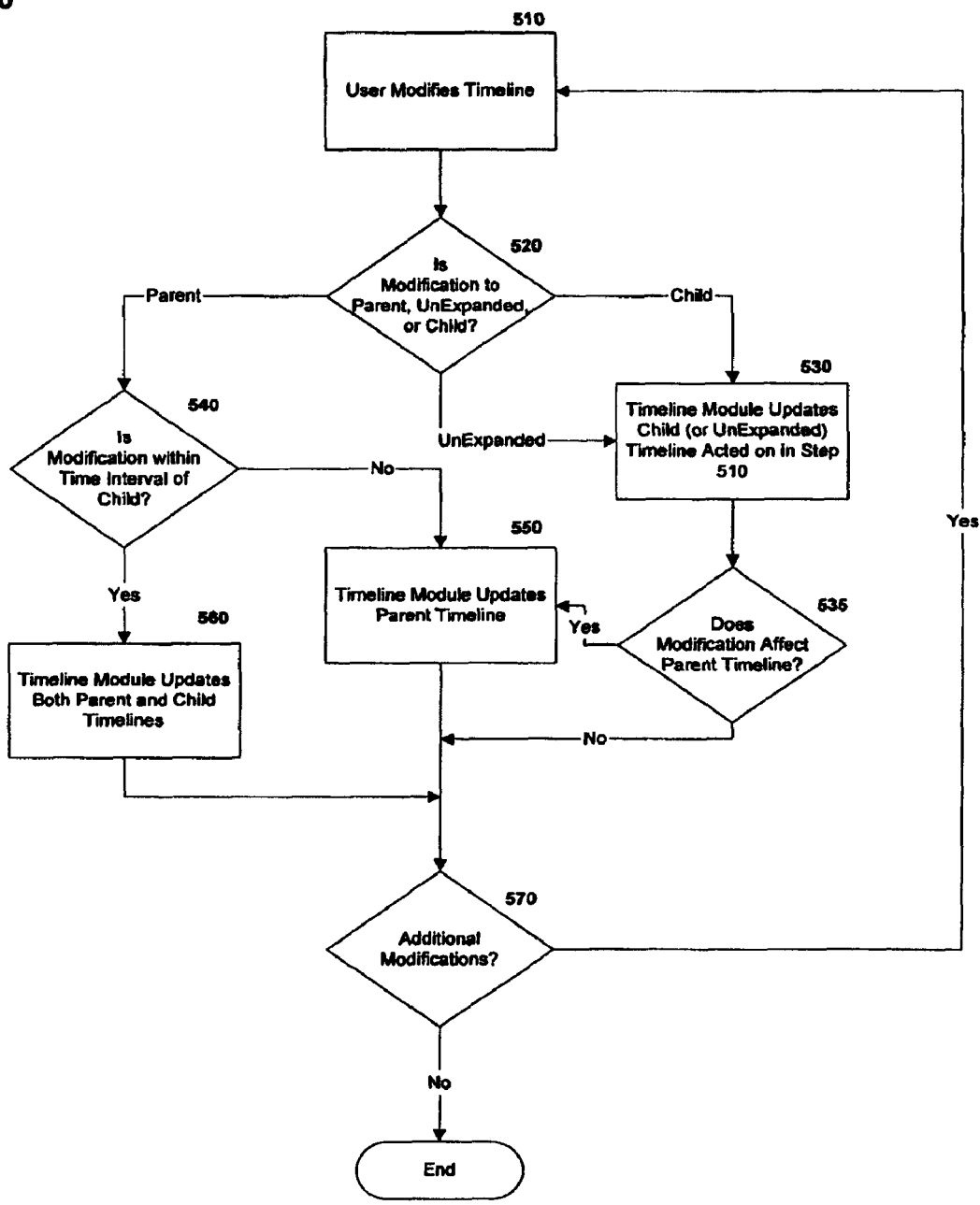
FIG. 5 is a flow diagram presenting a process for modifying dynamically-linked timelines in accordance with an exemplary embodiment of the present invention.

FIG. 5 is a flow diagram presenting a process 500 for modifying dynamically-linked timelines in accordance with an exemplary embodiment of the present invention. Referring to FIGS. 2 and 5, at step 510 the timeline module 220 detects a user modifying a timeline on a drawing sheet 215. This modification may include adding or removing milestones or changing other information of the timeline. For example, a milestone, interval, or other information may be added to or removed from a parent, child, or unexpanded timeline, that is, a timeline without a child timeline associated with it. Also, the portion of a parent timeline that is associated with a child timeline may be changed. For example, a parent timeline may correspond to a 12-month project and a child timeline correspond to two of those months. The child timeline could be modified to include three months or one month of the project, or some other time length that is a subset of the time represented by the parent timeline. At step 520, the timeline module 220 determines if the modification is to a parent timeline, a child timeline, or an unexpanded timeline, that is, a timeline that does not have a child timeline associated with it.

If the timeline is a child timeline or unexpanded timeline, the process moves to step 530, where the timeline module 220 updates the timeline acted upon in step 510. This updating step may include displaying the changes through a GUI and changing the configuration of the timeline overall or individual aspects of the timeline, such as an individual milestone. For example, at step 510, a user may drag a milestone icon from one position on an unexpanded timeline to another position, indicating a change in the time associated with that milestone. In this example, the timeline module 220, at step 530, would update the configuration of that milestone to indicate that the milestone is associated with the new date. Also, the timeline module 220 would update the display of the timeline to show the milestone in its new position on the timeline.

Similarly, the length of time that a child timeline is associated with a parent timeline could have been modified at step 510, such as by moving handles on a representative image of the child timeline on the parent timeline, moving the ends of the child timeline, or by modifying characteristics of the child timeline, such as by revising data in a form associated with the timeline's characteristics. If the length of time of the child timeline was expanded, milestones, intervals, or other information from the parent timeline associated with the added time would be added to the child timeline. For example, if a parent timeline had a milestone "A" associated with the date Aug. 20, 2004 and a child timeline associated with this parent and covering a time from of Jul. 1, 2004 to Jul. 31, 2004 is modified such that the child timeline now covers Aug. 20, 2004, then the timeline module 220 would automatically add milestone "A" to the child timeline at step 530.

Next, at step 535, the process 500 determines if the modification to the child timeline at step 510 affects a parent timeline. In other words, step 535 determines if the milestones, intervals, or other information changed at step 510 for the child timeline are contained on the portion of a parent timeline associated with that child timeline, such that the milestone, interval, or other information will need to be updated on the parent timeline as well. If yes, the process 500 moves to step 550 and the parent timeline is updated. Otherwise, it moves to step 570.

If the modification at step 510 was to a parent timeline, as decided at step 520, the process 500 moves to step 540 and determines if the modification was to information within the time interval associated with a child timeline. If the decision at step 540 is "No," the process 500 moves to step 550 and the timeline module 220 updates the parent timeline as modified in step 510. This updating step may include displaying the changes through a GUI and changing the configuration of the timeline overall or individual aspects of the timeline, such as an individual milestone. If the result at step 540 is "Yes," the process 500 moves to step 560 and the timeline module 220 updates both the child and parent timelines. For example, at step 510, a user may drag a milestone icon from one position on a parent timeline to another position, indicating a change in the time associated with that milestone. In this example, the timeline module 220, at step 560, would update the configuration of that milestone on both the parent timeline and the child timeline to indicate that the milestone is associated with the new date. Also, the timeline module 220 would update the display of the parent timeline and the child timeline to show the milestone in its new position on each of the timelines. A similar process would occur if a milestone or other piece of information was added to or deleted from the parent timeline.

Once the timeline or timelines have been updated, either at step 530, step 550, and/or step 560, the process 500 moves to step 570 to detect additional modifications. If additional modifications are detected, the process returns to step 510 and repeats the process through step 570. If no additional modifications are detected, the process 500 ends.

One possible modification at step 510 would be to associate the child timeline with a different parent timeline. This action may be accomplished by a user dragging the icon representing the child timeline that is presented on a parent timeline to a new parent. In this case, all of the data currently on the child would be deleted and the timeline module 220 would regenerate the child timeline, as in the process 300 described in FIG. 3. Alternatively, the child timeline could retail all of the information that was unique to the child timeline, that is, information added to the child timeline and not on the parent timeline.

Figure 6:
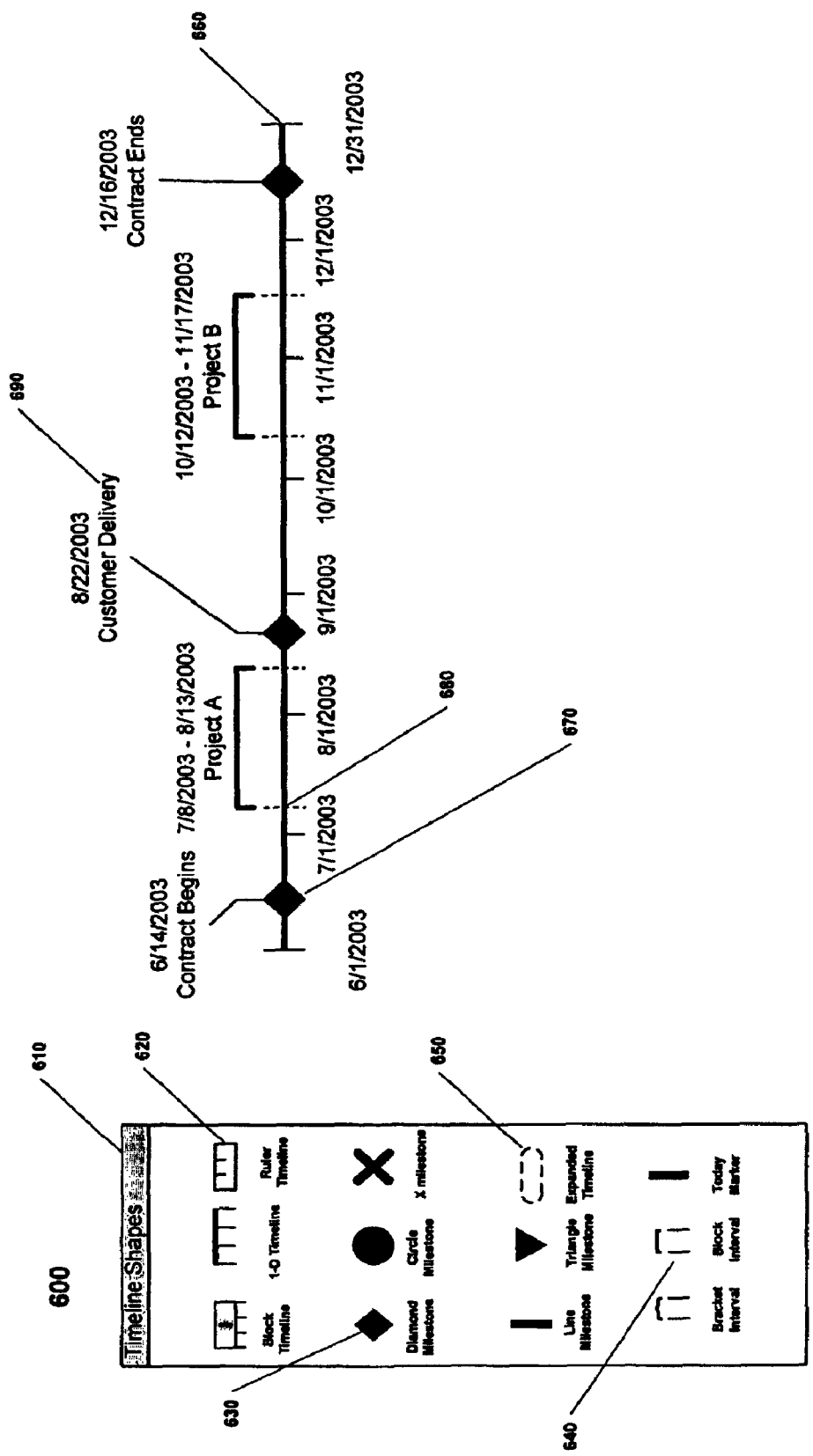
FIG. 6 is a display image depicting a timeline and shape stencil in accordance with an exemplary embodiment of the present invention.

FIG. 6 is a display image 600 depicting a timeline and shape stencil in accordance with an exemplary embodiment of the present invention. Referring to FIGS. 2 and 6, a drawing sheet 215 may present to a user a window 610 representing a stencil of shapes. These shapes can be dragged from the window 610 to the drawing sheet 215. The stencil may contains shapes specific for one type of diagramming, such as a timeline. The shapes may include timeline shapes, such as shape 620 representing a ruler timeline, milestone shapes, such as shape 630 representing a diamond shaped milestone, and time interval shapes, such as shape 640 representing a block interval. Additionally, an icon representing an expanded timeline, such as shape 650, may be on the stencil.

A user may drag a timeline icon onto the drawing sheet 215, which causes a timeline to be generated on the drawing sheet 215, such as timeline 660. The timeline can then be configured, such as by setting the start and end dates, adding milestones, such as milestone 670, which can be added to timeline 660 by dragging shape 630 to the timeline 660 and dropping it onto the timeline 660. Similarly, a block interval 680 can be added to timeline 660 by dragging and dropping the shape 640 onto the timeline 660. Also, additional information can be added to the timeline, such as providing labels to milestones and time intervals, such as label 690, "Customer Delivery."

Figure 7:
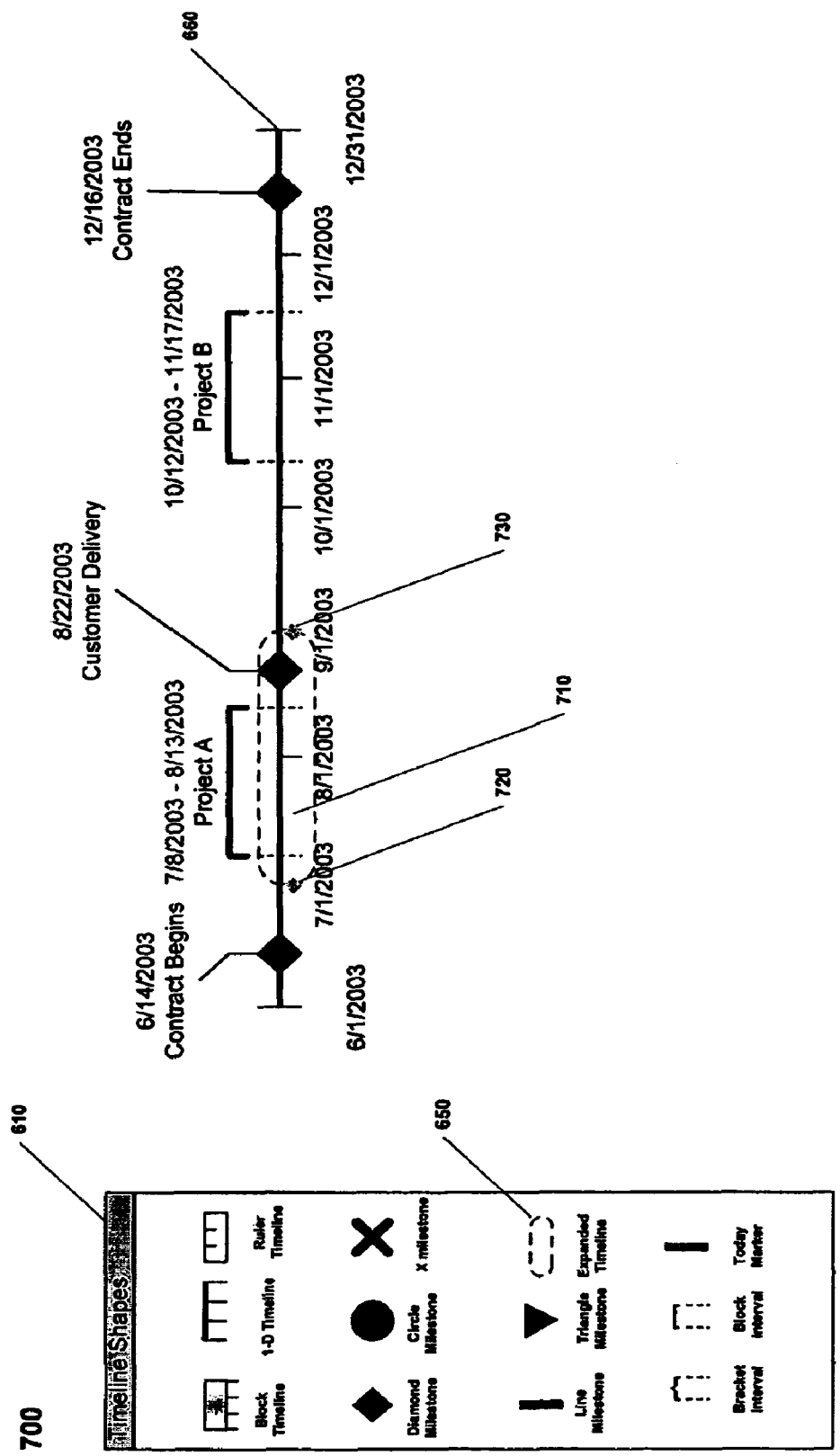
FIG. 7 is a display image depicting generating a child timeline by dragging and dropping a stencil icon in accordance with an exemplary embodiment of the present invention.

FIG. 7 is a display image 700 depicting generating a child timeline by dragging and dropping a stencil icon in accordance with an exemplary embodiment of the present invention. Referring to FIGS. 2 and 7, a child timeline can be generated from timeline 660 by dragging an expanded timeline, or similar, icon, such as shape 650, over to the timeline 660 from the window 610. The shape may become shape 710 when it is placed onto the timeline 660. The shape 710 may include a left handle 720 and a right handle 730 to allow the length of the shape 710 to be changed to approximate the time interval to be associated with the child timeline. In the example depicted on display image 700, the child timeline would be associated with the approximate time interval of Jul. 1, 2003 to Sep. 1, 2003.

Figure 8:
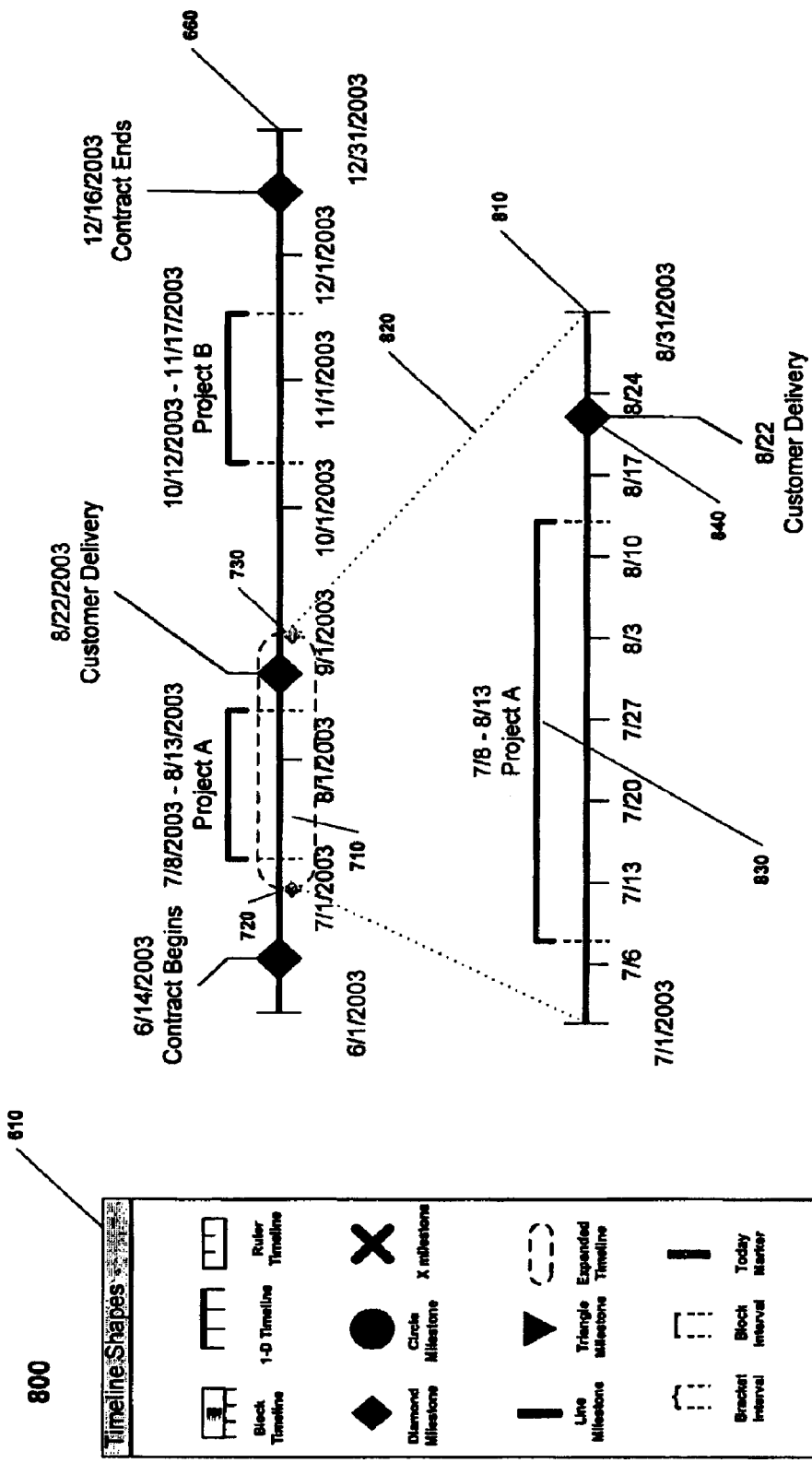
FIG. 8 is a display image depicting a child timeline dynamically-linked to a parent timeline in accordance with an exemplary embodiment of the present invention.

FIG. 8 is a display image 800 depicting a child timeline dynamically-linked to a parent timeline in accordance with an exemplary embodiment of the present invention. Referring to FIGS. 2 and 8, the display image 800 depicts an image after the timeline module 220 has automatically generated a child timeline 810 from the parent timeline 660. The parent timeline 660 may include a graphical indication that a child timeline is associated with the parent, such as shape 710, shown as a transparent oval with dashed lines, thus enabling the details of the timeline 660 in that time interval to be shown. Shape 710 may retain the right handle 720 and left hand 730 after the child timeline 810 is generated to enable modification of the time range associated with the child timeline 810. R relationship between the parent timeline 660 and child timeline 810 may also be shown through a dashed line connecting the two timelines, such as dashed line 820.

The timeline module 220 automatically places the information from the parent timeline 660 on the child timeline 810 from the time interval associated with the child timeline 810, as described above in connection with FIG. 3, step 350. As depicted on display image 800, time interval 830 and milestone 840 are included on the child timeline 810, each corresponding to information on the parent timeline 660 when the child timeline 810 was generated.

Figure 9:
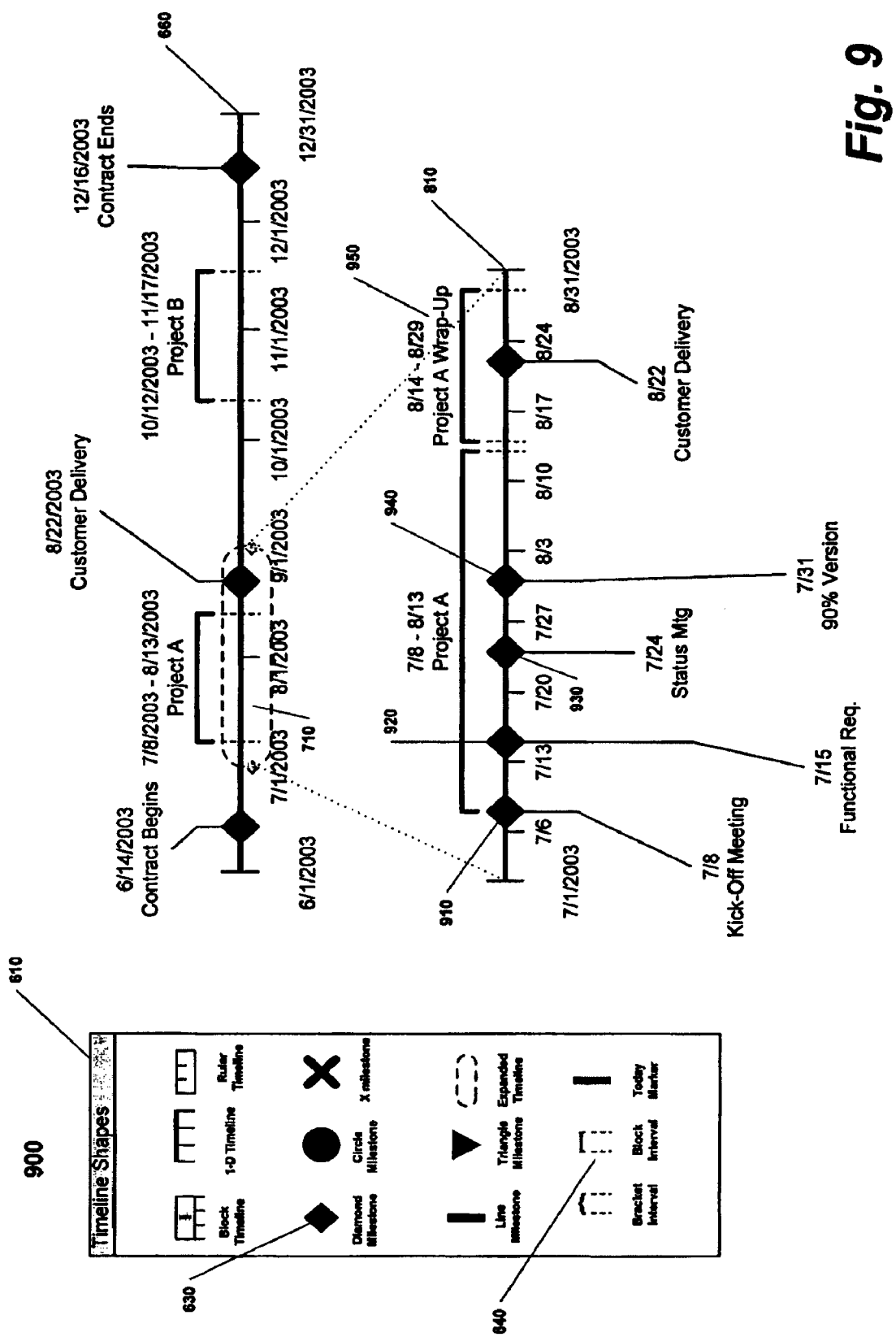
FIG. 9 is a display image depicting a child timeline dynamically-linked to a parent timeline with additional details added to the child timeline in accordance with an exemplary embodiment of the present invention.

FIG. 9 is a display image 900 depicting a child timeline dynamically-linked to a parent timeline with additional details added to the child timeline in accordance with an exemplary embodiment of the present invention. Referring to FIGS. 2 and 9, the display image 900 depicts a display after the time module 200 has added information to the child timeline 810, in response to a user modifying the timeline 810. For example, milestone 910, milestone 920, milestone 930, milestone 940, and a time interval 950 were added to the child timeline 810, perhaps by a user using a pointing device 265 to drag and drop shapes, such as shape 630 and shape 640, onto the timeline 810. The display image 900 illustrates an advantage of the present invention, allowing details to be presented for a time interval that could not be effectively presented with a timeline covering the entire time.

Figure 10:
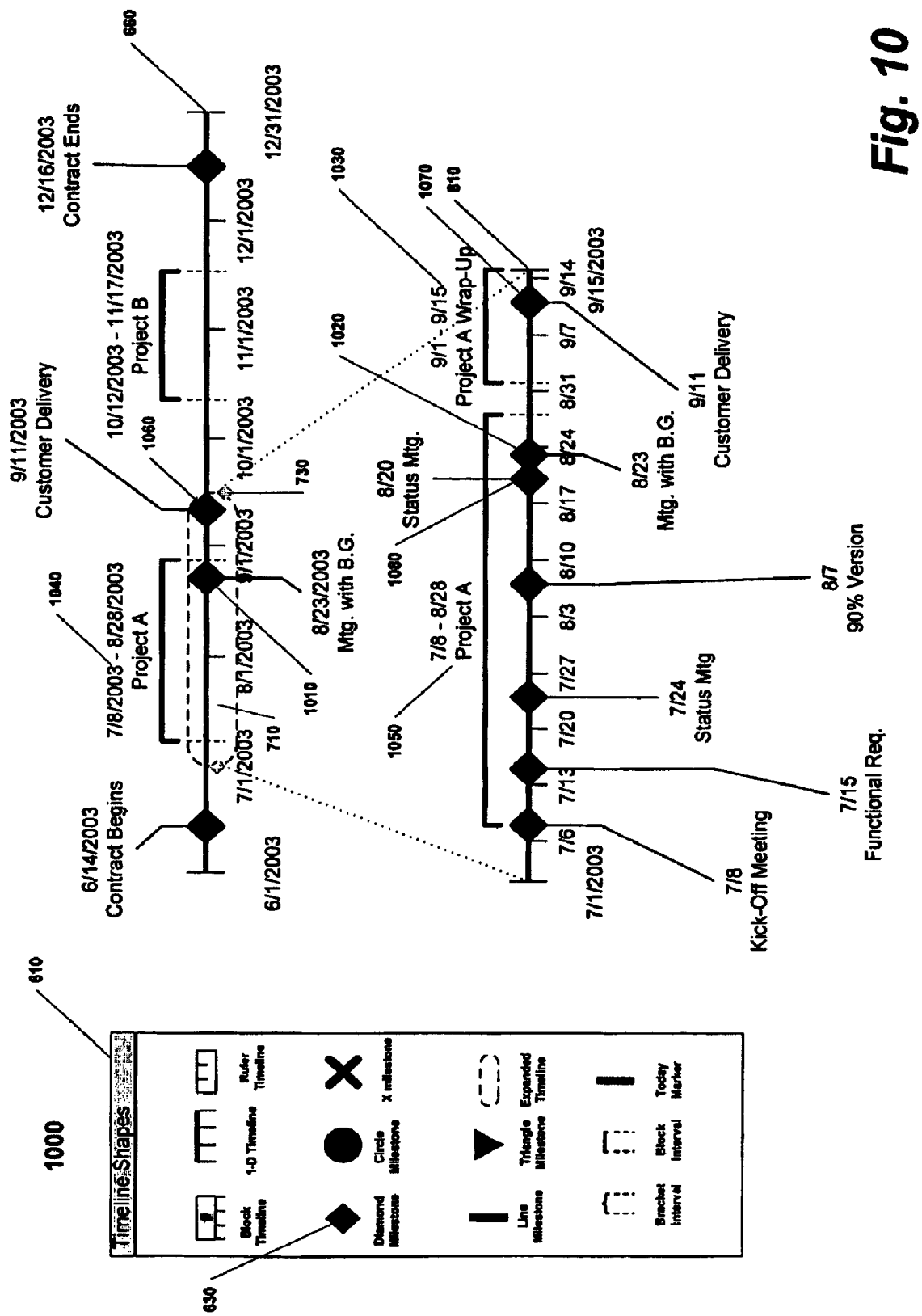
FIG. 10 is a display image depicting a child timeline dynamically-linked to a parent timeline with additional details added to the child timeline and changes made to the parent timeline in accordance with an exemplary embodiment of the present invention.

FIG. 10 is a display image 1000 depicting a child timeline dynamically-linked to a parent timeline with additional details added to the child timeline and changes made to the parent timeline in accordance with an exemplary embodiment of the present invention. Referring to FIGS. 2, 9, and 10, the display image 1000 depicts a display after modifications have been made to both the parent timeline 660 and the child timeline 810. The changes can be seen by comparing display image 1000 to display image 900. For example, a milestone 1010 was added to the parent timeline 660 at a position on the timeline 660 corresponding to Aug. 23, 2003 ("Mtg. with B.G."). In response to this modification, the timeline module 220 would have added the milestone onto the child timeline 810, as is seen with milestone 1020. Similarly, milestone 1060 from the parent timeline 660 ("Customer Delivery") was moved from a position on the timeline corresponding to Aug. 22, 2003 to a position corresponding to Sep. 11, 2003. This change is reflected on both the parent timeline 660, at milestone 1060, and child timeline 810, at milestone 1070. Also, a change in the time interval 1040 associated with Project A on the parent timeline 660 is reflected on the child timeline 810, at time interval 1050.

The display image 1000 also depicts changes that are made to the child timeline 810 only, such as a change to time interval 1030 and the addition of a milestone 1080 ("Status Mtg.") at a location corresponding to a time on the timeline 810 of Aug. 20, 2003. Since this milestone and time interval were not on or added to the parent timeline 660, the modification is reflected on the child timeline 810 only.

One skilled in the art would appreciate that the present invention supports a system and method for automatically generating a child timeline on a drawing sheet of a diagramming program such that the child timeline is dynamically linked to a parent timeline. The method allows for the automatic placing of information on the child timeline that was on the parent timeline when the child timeline is created. The method also supports modifying parent and child timelines and automatically updating a child timeline when changes are made to the parent timeline and these changes affect the time interval corresponding to the child timeline.

The invention claimed is:

1. A method in a computer system for identifying a portion of a parent timeline to display as a child timeline that is an expanded view of that portion of the parent timeline, the method comprising:
displaying a parent timeline that includes indications of events;
receiving an indication to overlay the parent timeline with an expanded timeline shape with one or more manipulatable handles;

in response to receiving the indication, displaying the expanded timeline shape to overlay a portion of the parent timeline;

receiving a manipulation of a handle;

in response to receiving the manipulation of the handle, adjusting the length of the displayed expanded timeline shape;

displaying a child timeline that is an expansion of the portion of the parent timeline overlaid by the expanded timeline shape, the child timeline including indications of events not displayed on the parent timeline, the child timeline and the parent timeline being displayed simultaneously;

receiving an indication to overlay the child timeline with a second expanded timeline shape with one or more manipulatable handles;

in response to receiving the indication, displaying the second expanded timeline shape to overlay a portion of the child timeline;

receiving a manipulation of a handle of the second expanded timeline shape;

in response to receiving the manipulation of the handle of the second expanded timeline shape, adjusting the length of the displayed second expanded timeline shape; and displaying a grandchild timeline that is an expansion of the portion of the child timeline overlaid by the second expanded timeline shape.

2. A method in a computer system for identifying a portion of a parent timeline to display as a child timeline that is an expanded view of that portion of the parent timeline, the method comprising:

displaying a parent timeline that includes indications of events;

receiving an indication to overlay the parent timeline with an expanded timeline shape with one or more manipulatable handles;

in response to receiving the indication, displaying the expanded timeline shape to overlay a portion of the parent timeline;

receiving a manipulation of a handle;

in response to receiving the manipulation of the handle, adjusting the length of the displayed expanded timeline shape;

displaying a child timeline that is an expansion of the portion of the parent timeline overlaid by the expanded timeline shape, the child timeline including indications of events not displayed on the parent timeline, the child timeline and the parent timeline being displayed simultaneously;

receiving a second manipulation of a handle; and in response to receiving the second manipulation of the handle, adjusting the length of the displayed expanded timeline shape; and adjusting the child timeline to represent the time corresponding to the adjusted length of the displayed expanded timeline.

3. The method of claim 2 including updating an event of the parent timeline within a time interval corresponding to the child timeline, automatically updating the child timeline.

4. The method of claim 2 including upon updating an event of the child timeline, automatically updating the parent timeline.

5. The method of claim 2 wherein one of the manipulatable handles is located at each end of the expanded timeline shape.

6. The method of claim 2 including displaying lines to connect ends of the expanded timeline shape to ends of the child timeline.

7. The method of claim 2 wherein events are milestones of a project.

8. A computer-readable storage device storing computer-executable instructions for controlling a computer system to display a child timeline that is an expanded view of a portion of a parent timeline, by a method comprising:

displaying the parent timeline;

receiving an indication to overlay the parent timeline with an expanded timeline shape;

in response to receiving the indication, displaying the expanded timeline shape to overlay a portion of the parent timeline;

receiving a manipulation of the expanded timeline shape;

in response to receiving the manipulation of the expanded timeline shape, adjusting the length of the displayed expanded timeline shape; and displaying a child timeline that is an expansion of the portion of the parent timeline overlaid by the adjusted expanded timeline shape, the child timeline and the parent timeline being displayed simultaneously wherein the displayed parent timeline and the displayed child timeline display include indications of events, the displayed child timeline including an indication of an event that is not included on the displayed parent timeline.

9. The computer-readable storage device of claim 8 wherein the expanded timeline shape includes a manipulatable handle.

10. The computer-readable storage device of claim 8 including upon updating an event of the parent timeline within a time interval corresponding to the child timeline, automatically updating the child timeline.

11. The computer-readable storage device of claim 8 including upon updating an event of the child timeline, automatically updating the parent timeline.

12. The computer-readable storage device of claim 8 wherein a handle is located at each end of the expanded timeline shape.

13. The computer-readable storage device of claim 8 including displaying lines to connect ends expanded timeline shape to ends of the child timeline.

14. A computer system for displaying a child timeline that is an expanded view of a portion of a parent timeline, comprising:

a memory storing computer-executable instructions of:

a component that displays the parent timeline;

a component that displays an expanded timeline shape to overlay a portion of the parent timeline;

a component that adjusts the length of the displayed expanded timeline shape based on user input; and a component that displays a child timeline that is an expansion of the portion of the parent timeline overlaid by the adjusted expanded timeline shape, the child timeline and the parent timeline being displayed simultaneously wherein the displayed parent timeline and the displayed child timeline display include indications of events, the displayed child timeline including an indication of an event that is not included on the displayed parent timeline; and a processor that executes the computer-executable instructions stored in the memory.

15. The computer system of claim 14 wherein the expanded timeline shape includes a manipulatable handle for adjusting the length of the expanded timeline shape.

16. The computer system of 14 including a component that, upon updating an event of the parent timeline within a time interval corresponding to the child timeline, updates the child timeline.

17. The computer system of 14 including a component that upon updating an event of the child timeline, updates the parent timeline.

* * * * *